United States Patent [19]
Griesser

[11] 4,349,090
[45] Sep. 14, 1982

[54] CLUTCH ASSEMBLY FOR GEAR TRANSMISSION

[75] Inventor: Walter Griesser, Friedrichshafen, Fed. Rep. of Germany

[73] Assignee: Zahnradfabrik Friedrichshafen AG, Friedrichshafen, Fed. Rep. of Germany

[21] Appl. No.: 141,150

[22] Filed: Apr. 17, 1980

[30] Foreign Application Priority Data

Apr. 20, 1979 [DE] Fed. Rep. of Germany ....... 2915965

[51] Int. Cl.³ .............................................. F16D 23/06
[52] U.S. Cl. ................................ 192/53 G; 192/53 F
[58] Field of Search .............. 192/53 F, 53 G; 74/339

[56] References Cited

U.S. PATENT DOCUMENTS

| | | | |
|---|---|---|---|
| 2,221,894 | 11/1940 | White ................................. | 192/53 F |
| 3,003,607 | 10/1961 | Magg ................................. | 192/53 F |
| 3,450,240 | 6/1969 | Lewis et al. ...................... | 192/53 G |
| 3,860,101 | 1/1975 | DeFeo et al. .................. | 192/53 G X |

FOREIGN PATENT DOCUMENTS

| | | | |
|---|---|---|---|
| 926468 | 4/1955 | Fed. Rep. of Germany . | |
| 1042978 | 11/1958 | Fed. Rep. of Germany .... | 192/53 F |
| 1152311 | 8/1963 | Fed. Rep. of Germany . | |
| 2306367 | 10/1976 | France .............................. | 192/53 F |
| 733745 | 7/1955 | United Kingdom . | |

OTHER PUBLICATIONS

Brochure entitled "ZF-B-Lock Synchronizer" (reference F 42290/R2964-168E), published Mar. 1967.

*Primary Examiner*—Allan D. Herrmann
*Attorney, Agent, or Firm*—Karl F. Ross

[57] ABSTRACT

A driving gear having external teeth in mesh with internal teeth of a sliding sleeve carries several peripherally spaced spring-loaded detent members which extend radially into an inner peripheral groove of the sleeve in a decoupling position of the latter, the sleeve being able to engage a driven gear coaxial with the driving gear only upon radially depressing these members against their spring force. A synchro ring coaxial with the two gears is limitedly rotatable relatively to the driving gear and has a clutch surface confronting a similar surface of the driven gear through a narrow clearance which closes when the ring, under an axial thrust from the detent members, is moved toward the driven gear by an incipient coupling shift of the sleeve. The synchro ring and the detent members are provided with coacting cam faces preventing a depression of these members by the sleeve, and thus a full shifting of the latter into meshing engagement with the driven gear, in a position of angular disalignment due to a speed difference between the driven gear and the ring.

6 Claims, 8 Drawing Figures

CLUTCH ASSEMBLY FOR GEAR TRANSMISSION

FIELD OF THE INVENTION

My present invention relates to a clutch assembly for an automotive or other transmission system in which a pair of coaxial gears, one of them driven, can be positively interconnected for joint rotation by an internally toothed sleeve meshing only with one gear in a decoupling position but engaging the teeth of both gears in a coupling position into which it is slidable after the two gears have been synchronized, i.e. are rotating at the same speed (which in certain cases could even be zero).

BACKGROUND OF THE INVENTION

The use of such a sliding sleeve is well known in constant-mesh gear transmissions of the synchromesh type, e.g. as described in "Principles of Automotive Vehicles", Manual TM9-8000 and TO36A-1-76, published January 1956 by the Department of the Army and the Air Force, pages 234-238. In the system described in that publication, the sleeve is in permanent mesh with a sliding gear splined to a main shaft and is releasably connected therewith for limited joint axial motion by a set of spring-loaded ball checks. The sliding gear and the coaxial gear to be driven thereby are provided with confronting frustoconical clutch surfaces which are separated by a small clearance in a decoupling position but contact each other when the first gear and its sleeve are axially moved toward a coupling position. The second gear is then frictionally entrained and accelerated (or possibly decelerated) until its speed substantially equals that of the first gear. Only then can the teeth of the sleeve enter between the teeth of the second gear, the two sets of teeth being suitably beveled at their confronting ends to facilitate the meshing engagement.

In lieu of a sliding gear it is also possible to use in such a system an axially fixed driving gear together with a so-called synchro ring coaxially interposed between the two gears, the synchro ring rotating with the driving gear but being axially entrainable by the sleeve through ball checks or the like to establish frictional contact between a clutch surface on that ring and a confronting clutch surface on the driven gear. Upon the establishment of such contact, the sleeve is released from the synchro ring and can be axially slid into engagement with the driven gear.

The completion of the shift of the sleeve into a coupling position, however, is not always smooth with either type of system and, when carried out too rapidly, could still give rise to annoying gear clashing.

OBJECT OF THE INVENTION

The principal object of my present invention, therefore, is to provide an improved gear transmission of the synchromesh type which effectively prevents by simple means any attempted meshing between the sleeve and the driven gear until and unless the relative slip of the gears has been eliminated.

Another object is to provide means in such a system designed to compensate for the wear of the clutch surfaces of the synchro ring and the selectively engageable gear.

SUMMARY OF THE INVENTION

Starting from a transmission with a first and a second gear which can be positively interconnected by a sliding sleeve permanently in mesh with the first gear, and with a synchro ring coaxially interposed between the two gears for the purpose described above, my invention provies detent means on the first gear engaging the sleeve in its decoupling position and bearing upon the synchro ring, in response to an incipient shift of the sleeve toward its coupling position, for urging same toward the second gear to establish frictional contact between the confronting clutch surfaces thereof. The synchro ring, while enabling disengagement of the detent means from the sleeve in a position of relative rotational alignment so as to permit completion of the sleeve shift, is provided with blocking means coacting with the detent means in a position of rotational disalignment of the ring relative to the first gear to resist disengagement of the sleeve from the dentent means, thereby preventing a complete shift of the sleeve into its coupling position. When the speed difference causing such disalignment has been substantially eliminated, the blocking means can be repressed by the sleeve through the intermediary of the detent means for establishing (or restoring) the rotational alignment needed for the clutch-in.

The detent means may comprise, pursuant to a more particular feature of my invention, a spring-loaded member extending substantially radially into an inner peripheral recess of the sleeve in the coupling position thereof; this recess may be part of a peripheral groove accommodating a plurality of such detent members angularly equispaced about the gear axis. The detent member and the recess have camming formations for urging that member radially inward upon an axial shift of the sleeve, dislodging it from the recess when the aligned position of the synchro ring permits a repression of the blocking means opposing such inward motion. The detent member is bracketed by a pair of webs on the synchro ring which act as the blocking means.

If the detent member is tiltable in an axial plane under pressure from the sliding sleeve, this tilting motion can be directly used for axially thrusting the synchro ring into frictional contact with the driven gear. Such a rocking motion in an axial plane retards the axial displacement of the synchro ring relative to the shift of the sleeve but correspondingly intensifies the contact pressure between the clutch surfaces of the ring and the gear Between the pair of webs bracketing each detent member, according to a further feature of my invention, the synchro ring may be provided with two symmetrical edges including acute angles with a plane transverse to the gear axis; a projection on the detent member bears upon one or the other of these edges in a respective disalignment position of the ring. The detent member and the webs have coacting cam faces which parallel these edges and fulfill the aforedescribed blocking function in a disalignment position; and webs and the first gear are, moreover, provided with contact faces which are substantially perpendicular to those symmetrical edges and jointly define the limits of rotatability of the synchro ring relative to the first gear whereby, as more fully described hereinafter, the effects of wear of the clutch surfaces of the ring and the driven gear are compensated in terms of the extent to which the sleeve may approach the driven gear before being arrested by the blocking means (i.e. by the coacting cam faces) in the absence of synchronism.

BRIEF DESCRIPTION OF THE DRAWING

The above and other features of my invention will now be described in detail with reference to the accompanying drawing in which.

SPECIFIC DESCRIPTION

Figure 1:
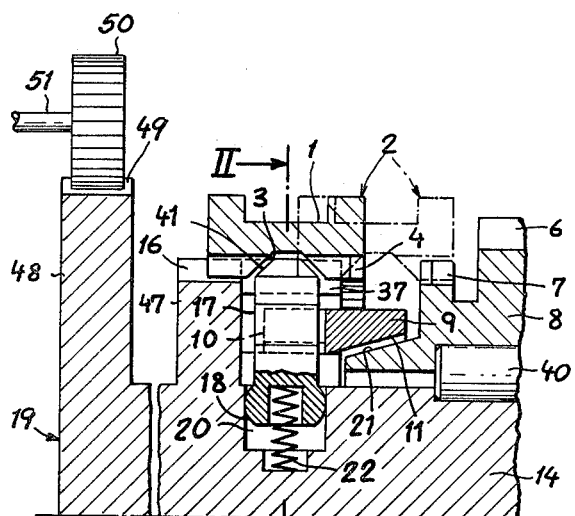
FIG. 1 is an axial sectional view of one half of a clutch assembly embodying my invention.
Figure 2:
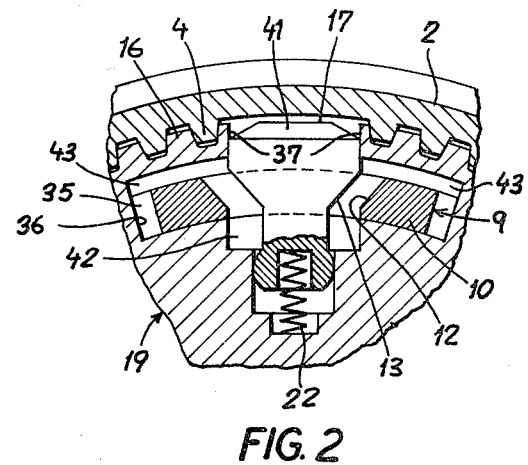
FIG. 2 is a fragmentary cross-sectional view taken on the line II—II of FIG. 1.

In FIGS. 1 and 2 I have shown a clutch assembly comprising a driving gear 19 of an automotive transmission having a flange 48 which carries teeth 49 in mesh with a pinion 50 on an engine-powered input shaft 51. Flange 48 is integral with or otherwise secured to a shaft 14 on which a driven gear 8 is rotatably but non-shiftably supported by bearing rollers 40. A hub 47 of gear 19 carries another set of teeth 16 in permanent mesh with internal teeth 4 of a sliding sleeve 2 which has an outer peripheral groove 1 engaged by the usual shift fork (not shown). Driven gear 8 has a set of teeth 7 of the same diameter and pitch has teeth 16 and can thus be positively coupled with driving gear 19 when the sleeve 2 is slid from its full-line decoupling position into a coupling position indicated in phantom lines in FIG. 1.

Driving gear 19 is provided in the region of its hub 47 with a plurality of peripherally equispaced pits 20 and cutouts 42, e.g. three (only one shown), each pivotally accommodating a spheroidally convex foot 18 of a detent member 17 urged radially outward by a compression spring 22. Each detent member is free to rock in an axial plane of gears 8 and 19 but is laterally restrained by cheeks 37 of hub 47 flanking the respective cutout 42; gear teeth 16 are interrupted in the area of that cutout. Member 17 is a peg having an enlarged rectangular head, engaged by the cheeks 37, with camming edges 41 substantially paralleling two beveled boundaries of a trapezoidally profiled inner peripheral groove 3 of sleeve 2 into which this head projects in the illustrated decoupling position. Hub 47 of gear 19 also has lateral undercuts 43 on opposite sides of each cutout 42 supporting a pair of axial webs 10 of a synchro ring 9 for limited rotation relative to this gear; the two webs have beveled faces 12 which in an alignment position shown in FIG. 2 give passage to the head of member 17 to allow its depression by the camming action of groove 3 and edges 41 upon a shifting of sleeve 2 into its coupling position. Ring 9 is rotatable relatively to gear 19 within limits established by contact faces 35, 36 of webs 10 at hub 47. When synchro ring 9 is relatively rotated from this alignment position to one side or the other, one of its faces 12 closely underlies the corresponding face 13 of member 17 to prevent its depression.

Synchro ring 9 has a frustoconical clutch surface 11 separated by a narrow clearance from a complementary surface 21 of driven gear 8 when the sleeve 2 is in its decoupling position. Upon an incipient shift of that sleeve toward its alternate position, i.e. to the right in FIG. 1, the several members 17 tilt slightly in the same direction and exert an axial thrust upon synchro ring 9 whereby the two clutch surfaces 11 and 21 come into frictional contact with each other. As long as a speed difference exists between gear 8 and gear 19 rotating jointly with ring 9, this ring is displwaced into a disalignment position in which a web face 12 thereof blocks the descent of the associated detent member 17 (possibly even raising it slightly) so that further shifting of sleeve 2 is prevented. Only when the two gears have been substantially synchronized, i.e. when their relative torque decreases to almost zero, will the user be able to slide the sleeve 2 into engagement with gear 8 as the camming action of groove 3 and edges 41 and of faces 12, 13 restores or establishes the aligned ring position in which each detent member 17 is centered between the respective webs 10. The retardation of the axial shift of ring 9 relative to that of sleeve 2 intensifies the contact pressure between surfaces 11 and 21 exerted by a rightward displacement of the sleeve.

Figure 3:
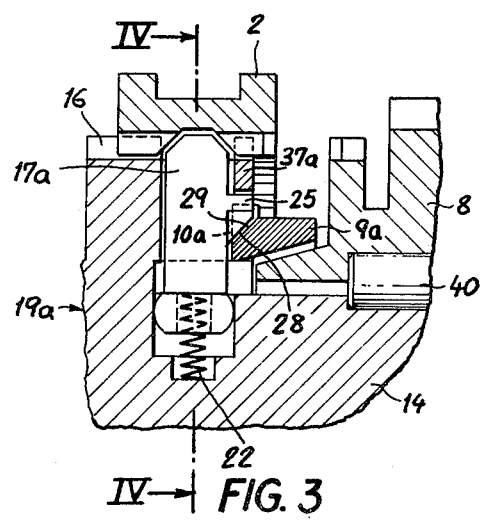
FIG. 3 is a view similar to that of FIG. 1, illustrating another embodiment.
Figure 4:
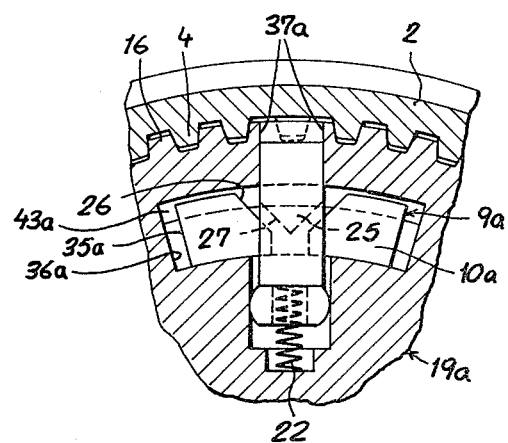
FIG. 4 is a fragmentary cross-sectional view taken on the line IV—IV of FIG. 3.

In the embodiment of FIGS. 3 and 4 a set of detent members 17a are guided in a driving gear 19a for substantially radial motion as in the preceding embodiment. Each detent member is here provided with a lug 25 having three beveled faces, i.e. two lateral faces 27 and a front face 28, paralleling respective inner faces 26 of webs 10a and an intervening cam face 29 of a modified synchro ring 9a. In this instance, a preliminary inward depression of detent members 17a by an incipient coupling shift of sleeve 2 cams the ring 9a into frictional contact with gear 8 on shaft 14, through the interaction of faces 28 and 29, while faces 26, 27 prevent any further depression of the detent member and thus any additional shift of sleeve 2 until synchronism has been established. Outer faces 35a of webs 10a contact respective faces 36a at the ends of lateral undercuts 43a in the disalignment positions of ring 9a.

Figure 5:
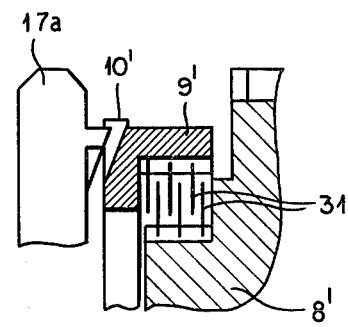
FIG. 5 is an axial sectional detail view depicting a modification.

As illustrated in FIG. 5, a modified synchro ring 9' with webs 10' (here coacting with a detent member 17a of the type shown in FIGS. 3 and 4) is frictionally engageable with a driven gear 8', upon slight axial displacement, via a lamellate clutch 31 having interleaved annular foils respectively carried on the ring and the gear. Such a clutch could, of course, also be used with a synchro ring otherwise similar to the ring 9 of FIGS. 1 and 2.

Figure 6:
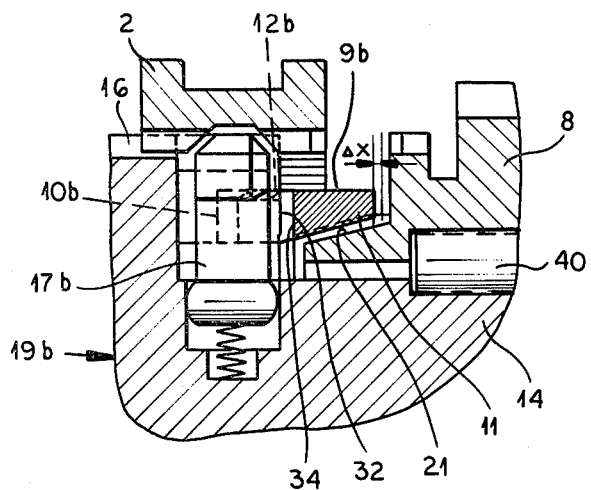
FIG. 6 is a view similar to that of FIGS. 1 and 3, relating to a further embodiment.
Figure 7:
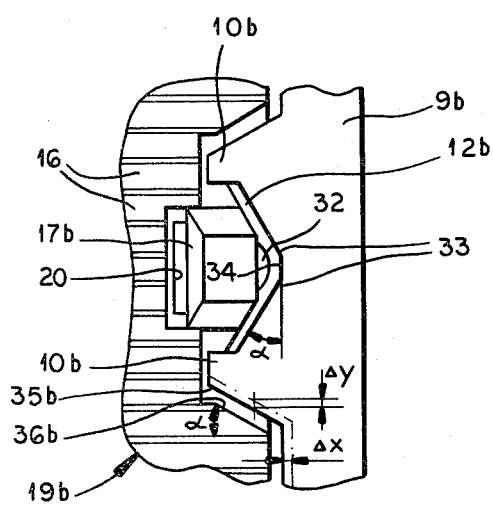
FIG. 7 is a fragmentary top view of the assembly shown in FIG. 6.

In FIGS. 6 and 7 I have shown part of another clutch assembly according to my invention in which a driving gear 19b carries detent members 17b (again only one shown) each provided with a lug 32 confronting, in the illustrated alignment position, a flat zone 34 of a synchro ring 9b lying in a plane transverse to the gear axis. Zone 34 is flanked by two symmetrically sloping edges 33 of ring 9b including with that plane an acute angle α. Webs 10b of ring 9b have oblique faces 12b in line with edges 33 and parallel to beveled faces 13b of detent member 17b with which they coact in the above-described manner to prevent its inward depression in a disalignment position of ring 9b. Contact face 35b, 36b of webs 10b and gear 19b are inclined to the axial direction at the aforementioned angle α (being thus perpendicular to the respective proximal dges 33) and, in the alignment position, are separated by gaps whose width in the peripheral direction substantially equals the peripheral distance between faces 12b, 13b.

In practice, the alignment position in unstable and will occur only transistorily when the sleeve 2 is retracted and the detent members are pressed outward by their springs 22. In the embodiment of FIGS. 6 and 7 the axially and angularly floating ring 9b will then tend to lie as close as possible to gear 8 without actually touching same, with one of the sloping end faces 35b of each pairs of webs 10b contacting the corresponding gear face 36b. When the clutch surfaces 11, 21 of ring 9b and gear 8 become worn, the ring will come to rest further to the right whereby the axial distance between projection 33 and zone 34 will change by an increment ΔX. At the same time, however, the ring 9b is peripherally displaced in its terminal disalignment position by a tangential increment ΔY so that, upon a rightward shift of sleeve 2, the detent member 17b is arrested by one of the edges 33 in the same axial position as formerly. Thus, the wear of the clutch surfaces will not change the extent to which the sleeve 2 may approach the gear 8 before synchronization takes place.

When the sleeve escapes its detent members 17 etc. after the disappearance of the differential torque, the axial pressure exerted upon these members terminates so that, as with known synchromesh systems, the frictional contact of the clutch surfaces is diminished and teeth 4 and 7 can readily align themselves with one another for the final clutch-in. An assembly according to my invention can therefore be easily substituted for a conventional one in an existing gear transmission.

Figure 8:
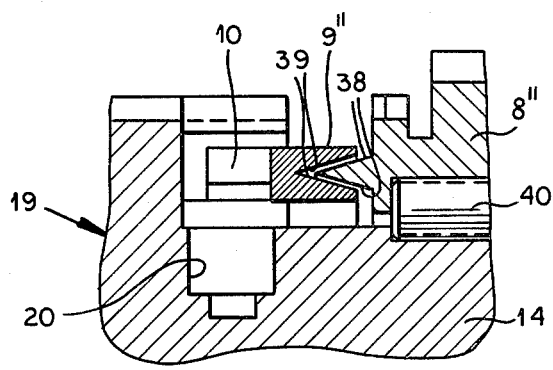
FIG. 8 is a further axial sectional view showing another modification.

The simple frustoconical clutch surfaces 11 and 21 may be replaced, in all instances, by a double cone with surfaces 38, 39 as illustrated in FIG. 8 for a modified driven gear 8" and synchro ring 9". The assembly of FIG. 8 is designed to increase the frictionally transmitted torque but corresponds otherwise to that of FIGS. 1 and 2, including detent member 17 which has been omitted in this view for greater clarity.

Since sleeve 2 always rotates jointly with driving gear 19 etc., its continuous groove 3 could be subdivided into separate recesses accommodating individual detent members.

It will be apparent that the roles of driving and driven gears may be interchanged, i.e. that gear 8 or 8" could be powered by the engine to entrain the gear 19, 19a or 19b upon being synchronized therewith and engaged by sleeve 2.

It is also possible to modify the transmission according to my invention by inserting a second synchro ring and another driven gear on shaft 14 of gear 19, for example, between flange 48 and hub 47 and by making that hub symmetrical about pits 20, allowing sleeve 2 to be optionally shifted to the left in FIG. 1 to engage the other driven gear. In this way I can let the driving gear 19 entrain either of two gear trains for the transmission of different torques and possibly different directions of rotation to a nonillustrated output shaft and thus to the vehicular traction wheels.

I claim:

1. In a gear transmission having a first gear, a second gear coaxial with said first gear, said gears being provided with respective sets of teeth of like pitch and diameter, and an internally toothed sleeve meshing only with the teeth of said first gear in a decoupling position, said sleeve being axially slidable into a coupling position in which it meshes with the teeth of said first and second gears for positively connecting same to each other, the combination therewith of a synchro ring coaxially interposed between said gears with freedom of limited rotation relative to said first gear, said synchro ring and said second gear being provided with confronting clutch surfaces separated by a small clearance from each other in the decoupling position of said sleeve, a spring-loaded rocker member with a foot pivotally received in said first ger and with a head extending substantially radially into an inner peripheral recess of said sleeve in said decoupling position, said head and said recess having camming formations for urging said member radially inward against the spring force acting thereon upon an axial shift of said sleeve, a part of said member between said head and said foot bearing upon said synchro ring for urging same toward said second ger by tilting in an axial plane in response to an incipient shift of said sleeve toward said coupling position, said synchro ring enabling disengagement of said head from said sleeve in a position of relative rotational alignment of said gears to permit said shift to be completed, and a pair of webs on said synchro ring laterally bracketing said member and cammingly coacting therewith in a position of rotational disalignment of said synchro ring relative to said first gear to resist disengagement of said head from said sleeve and thereby to prevent a complete shift of said sleeve into said coupling position, such disalignment resulting from a speed difference between said first and second gears upon the establishment of frictional contact between said clutch surfaces by an axial thrust exerted upon said synchro ring by said member, said webs being repressible by said sleeve through the intermediary of said member for establishing said relative rotational alignment upon the substantial elimination of said speed difference.

2. In a gear transmission having a first gear, a second gear coaxial with said first gear, said gears being provided with respective sets of teeth of like pitch and diameter, and an internally toothed sleeve meshing only with the teeth of said first gear in a decoupling position, said sleeve being axially slidable into a coupling position in which it meshes with the teeth of said first and second gears for positively connecting same to each other, the combination therewith of a synchro ring coaxially interposed between said gears with freedom of limited rotation relative to said first gear, said synchro ring and said second gear being provided with confronting clutch surfaces separated by a small clearance from each other in the decoupling position of said sleeve, a spring-loaded detent member on said first gear extending substantially radially into an inner peripheral recess of said sleeve in said decoupling position, said member and said recess having camming formations for urging said member radially inward against the spring force acting thereon upon an axial shift of said sleeve, said member bearing upon said synchro ring for urging same toward said second gear in response to an incipient shift of said sleeve toward said coupling position, said synchro ring enabling disengagement of said member from said sleeve in a position of relative rotational alignment of said gears to permit said shift to be completed, and a pair of webs on said synchro ring bracketing said member and cammingly coacting therewith in a position of rotational disalignment of said synchro ring relative to said first gear to resist disengagement of said member from said sleeve and thereby to prevent a complete shift of said sleeve into said coupling position, such disalignment resulting from a speed difference between said first and second gears upon the establishment of frictional contact between said clutch surfaces by an axial thrust exerted upon said synchro ring by said member, said webs being repressible by said sleeve through the intermediary of said member for establishing said reltive rotational alignment upon the substantial elimination of said speed difference, said synchro ring being provided between said webs with two symmetrical edges including acute angles with a plane transverse to the gear axis, said member having a projection bearing upon said symmetrical edges in respective disalignment positions, said member and said webs having coacting cam faces paralleling said symmetrical edges, said first gear and said webs being provided with contact faces which are substantially perpendicular to said symmetrical edges and jointly define the limits of rotatability of said synchro ring relative to said first gear.

3. The combination defined in claim 2 wherein said member is limitedly tiltable toward said synchro ring in an axial plane upon an incipient shift of said sleeve toward said coupling position.

4. The combination defined in claim 2 or 1 wherein said member is provided with cam means axially displacing said synchro ring upon an initial inward depression of said member against the spring force thereof.

5. The combination define in claim 2 or 1 wherein said clutch surfaces are frustoconical.

6. The combination defined in claim 2 or 1 wherein said clutch surfaces are formed by interleaved lamellae.

* * * * *